United States Patent
Matsushita et al.

(10) Patent No.: US 10,919,147 B2
(45) Date of Patent: Feb. 16, 2021

(54) PARALLEL LINK ROBOT AND PARALLEL LINK ROBOT SYSTEM

(71) Applicant: KABUSHIKI KAISHA YASKAWA DENKI, Kitakyushu (JP)

(72) Inventors: Shigeo Matsushita, Kitakyushu (JP); Takashi Hatanaka, Kitakyushu (JP)

(73) Assignee: KABUSHIKI KAISHA YASKAWA DENKI, Kitakyushu (JP)

(*) Notice: Subject to any disclaimer, the term of this patent is extended or adjusted under 35 U.S.C. 154(b) by 138 days.

(21) Appl. No.: 16/267,388

(22) Filed: Feb. 5, 2019

(65) Prior Publication Data
US 2019/0275669 A1  Sep. 12, 2019

(30) Foreign Application Priority Data
Mar. 12, 2018 (JP) .................. 2018-044057

(51) Int. Cl.
*B25J 9/10* (2006.01)
*B25J 9/00* (2006.01)
(Continued)

(52) U.S. Cl.
CPC ........... *B25J 9/1065* (2013.01); *B25J 9/0051* (2013.01); *B25J 9/0084* (2013.01); *B25J 9/1623* (2013.01);
(Continued)

(58) Field of Classification Search
CPC ...... B25J 9/1065; B25J 9/0051; B25J 9/0084; B25J 9/1623; B25J 17/0266; B25J 17/0275
See application file for complete search history.

(56) References Cited

U.S. PATENT DOCUMENTS

| | | | |
|---|---|---|---|
| 8,132,481 B2* | 3/2012 | Nishida ................ | B25J 9/0051 74/490.01 |
| 8,181,551 B2* | 5/2012 | Breu .................... | B25J 19/06 74/490.01 |

(Continued)

FOREIGN PATENT DOCUMENTS

| | | |
|---|---|---|
| DE | 102010014647 A1 | 10/2011 |
| EP | 3498430 A1 | 6/2019 |

(Continued)

OTHER PUBLICATIONS

Japanese Office Action for corresponding JP Application No. 2018-044057, dated Sep. 17, 2019 (w/ machine translation).

(Continued)

*Primary Examiner* — David M Fenstermacher
(74) *Attorney, Agent, or Firm* — Mori & Ward, LLP

(57) ABSTRACT

A parallel link robot includes a base, a movable part, link mechanisms, and actuators. The movable part is movable along a center axis. The first, second and third link mechanisms are provided around the center axis with angular intervals in a circumferential direction around the center axis to project outwardly along a radial direction with respect to the center axis. Each of the first, second and third link mechanisms connects the base and the movable part to move the movable part along the center axis. The angular intervals have an acute angular interval with an acute angle. The first, second and third actuators are provided at the base to be connected to the first, second and third link mechanisms respectively so as to drive the first, second and third link mechanisms respectively.

14 Claims, 12 Drawing Sheets

(51) Int. Cl.
*B25J 9/16* (2006.01)
*B25J 17/02* (2006.01)
(52) U.S. Cl.
CPC ....... *B25J 17/0266* (2013.01); *B25J 17/0275* (2013.01)

(56) References Cited

U.S. PATENT DOCUMENTS

| | | | | |
|---|---|---|---|---|
| 8,272,290 | B2* | 9/2012 | Zhang | B25J 9/107 74/490.01 |
| 8,307,732 | B2* | 11/2012 | Kinoshita | B25J 9/0051 74/490.01 |
| 8,418,579 | B2* | 4/2013 | Zhang | B25J 9/0051 74/490.04 |
| 8,516,917 | B2* | 8/2013 | Zhao | B25J 17/0266 74/490.01 |
| 8,601,897 | B2* | 12/2013 | Lauzier | B25J 9/0048 74/490.01 |
| 8,714,903 | B2* | 5/2014 | Feng | B25J 9/0051 414/735 |
| 8,882,437 | B2* | 11/2014 | Nakanishi | B65G 49/061 414/735 |
| 8,899,126 | B2* | 12/2014 | Worz | B25J 9/1623 74/490.05 |
| 8,973,459 | B2* | 3/2015 | Fukudome | B25J 9/0051 74/490.01 |
| 2008/0141813 | A1 | 6/2008 | Ehrat | |
| 2013/0209209 | A1 | 8/2013 | Fukudome et al. | |
| 2018/0207810 | A1 | 7/2018 | Konagai et al. | |

FOREIGN PATENT DOCUMENTS

| | | |
|---|---|---|
| JP | 2005-237168 A | 9/2005 |
| JP | 2013-158874 | 8/2013 |
| JP | 2017-061004 A | 3/2017 |
| JP | 2018-001385 A | 1/2018 |
| WO | WO 2011/128057 A1 | 10/2011 |
| WO | WO 2018/069750 A1 | 4/2018 |

OTHER PUBLICATIONS

XP054979496, Wasin Wongkum: "Delta Robot with Asymmetric configuration" Youtube, Feb. 17, 2015, pp. 1-2, Retrieved from the Internet: URL: https://www.youtube.com/watch?v=18XX0Zsg9Zc Retrieved on Jul. 2, 2019.

Extended European Search Report for corresponding EP Application No. 17785747.1, dated Mar. 11, 2019.

* cited by examiner

PARALLEL LINK ROBOT AND PARALLEL LINK ROBOT SYSTEM

CROSS-REFERENCE TO RELATED APPLICATIONS

The present application claims priority under 35 U.S.C. § 119 to Japanese Patent Application No. 2018-044057, filed Mar. 12, 2018. The contents of this application are incorporated herein by reference in their entirety.

BACKGROUND

Field of the Invention

The embodiments disclosed herein relate to a parallel link robot and a parallel link robot system.

Discussion of the Background

JP 2013-158874A discloses a parallel link robot that includes three link mechanisms arranged in the circumferential direction at equal angular intervals.

SUMMARY

According to one aspect of the present disclosure, a parallel link robot includes a base, a movable part, link mechanisms, and actuators. The movable part is movable along a center axis. An end effector is attachable to the movable part. The first, second and third link mechanisms are provided around the center axis with angular intervals in a circumferential direction around the center axis to project outwardly along a radial direction with respect to the center axis. Each of the first, second and third link mechanisms connects the base and the movable part to move the movable part along the center axis. The angular intervals have an acute angular interval with an acute angle. The first, second and third actuators are provided at the base to be connected to the first, second and third link mechanisms respectively so as to drive the first, second and third link mechanisms respectively.

According to another aspect of the present disclosure, a parallel link robot system includes first and second parallel link robots. Each of the first and second parallel link robots includes a base, a movable part which is movable along a center axis and to which an end effector is attachable, first, second and third link mechanisms provided around the center axis with angular intervals in a circumferential direction around the center axis to project outwardly along a radial direction with respect to the center axis, and first, second and third actuators provided at the base to be connected to the first, second and third link mechanisms respectively so as to drive the first, second and third link mechanisms respectively. Each of the first, second and third link mechanisms connects the base and the movable part to move the movable part along the center axis. The angular intervals includes a 120-degree angular interval having an angle of 120°, a larger angular interval having a larger angle that is larger than 120° by a predetermined angle, and a smaller angular interval having a smaller angle that is smaller than 120° by the predetermined angle. The first and second parallel link robots are arranged such that a first bisecting line which bisects the 120-degree angular interval of the first parallel link robot and a second bisecting line which bisects the 120-degree angular interval of the second parallel link robot are aligned and such that the first link mechanism of the first parallel link robot and the first link mechanism of the second parallel link robot are provided to be substantially parallel, the second link mechanism of the first parallel link robot and the second link mechanism of the second parallel link robot are provided to be substantially parallel, and the third link mechanism of the first parallel link robot and the third link mechanism of the second parallel link robot are provided to be substantially parallel.

According to the other aspect of the present disclosure, a parallel link robot system includes first and second parallel link robots. Each of the first and second parallel link robots includes a base, a movable part which is movable along a center axis and to which an end effector is attachable, first, second and third link mechanisms provided around the center axis with angular intervals in a circumferential direction around the center axis to project outwardly along a radial direction with respect to the center axis, and first, second and third actuators provided at the base to be connected to the first, second and third link mechanisms respectively so as to drive the first, second and third link mechanisms respectively. Each of the first, second and third link mechanisms connects the base and the movable part to move the movable part along the center axis. The angular intervals have an acute angular interval with an acute angle. The first and second parallel link robots are arranged such that a first line perpendicular to a bisecting line which bisects the acute angle of the first parallel link robot and a second line perpendicular to a bisecting line which bisects the acute angle of the second parallel link robot are aligned and such that the first link mechanism of the first parallel link robot and the first link mechanism of the second parallel link robot are provided to be substantially parallel, the second link mechanism of the first parallel link robot and the second link mechanism of the second parallel link robot are provided to be substantially parallel, and the third link mechanism of the first parallel link robot and the third link mechanism of the second parallel link robot are provided to be substantially parallel.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
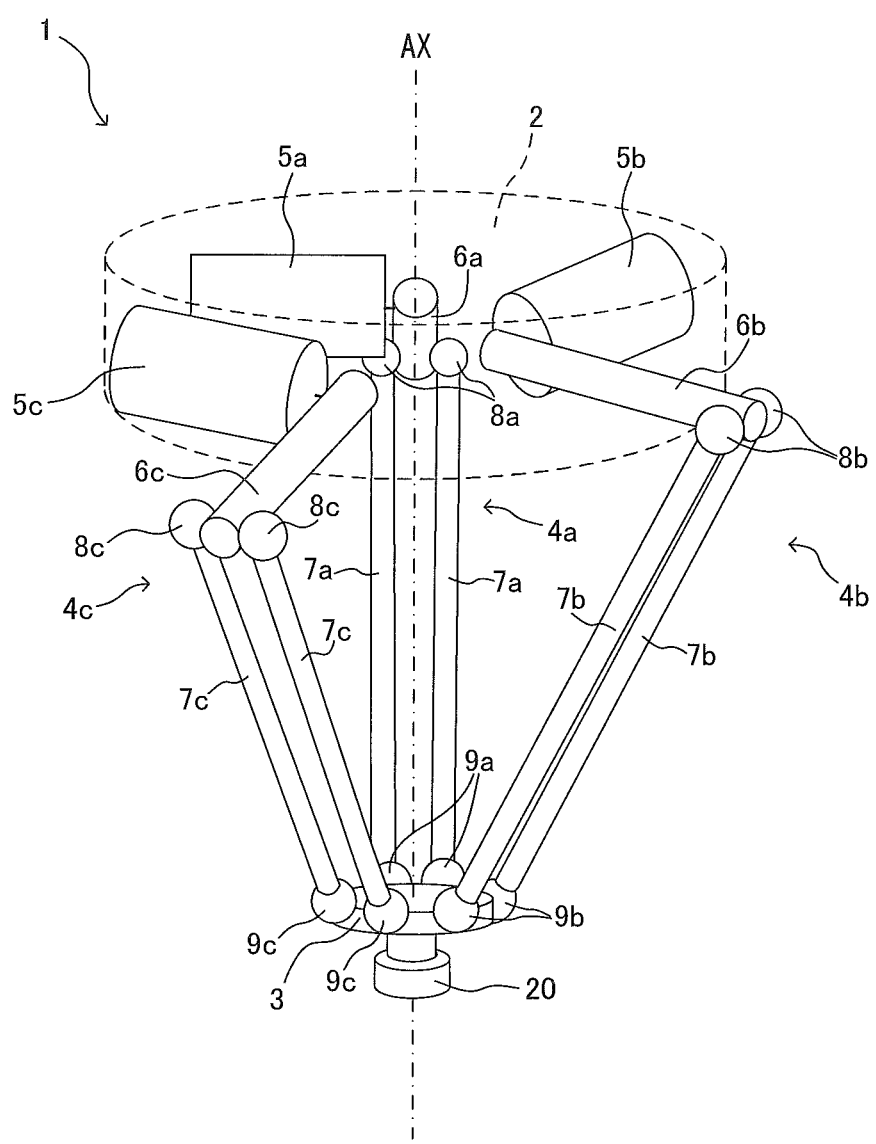
FIG. 1 is a perspective view of an example general configuration of a parallel link robot according to a first embodiment.

The embodiments will now be described with reference to the accompanying drawings, wherein like reference numerals designate corresponding or identical elements throughout the various drawings.

1. First Embodiment

The first embodiment will be described by referring to the accompanying drawings. For convenience of description of configurations of a parallel link robot(s) and related elements, the following description uses "up", "down", "right", "left", "front", "rear", and other direction indicating terms. These direction indicating terms, however, are not intended as limiting the relative positions of the parallel link robot(s) and the related elements.

1-1. General Arrangement of Parallel Link Robot

By referring to FIG. 1, an example general arrangement of a parallel link robot 1 according to the first embodiment will be described.

As illustrated in FIG. 1, the parallel link robot 1 includes a base 2, a movable part 3, three link mechanisms 4a, 4b, and 4c, and three actuators 5a, 5b, and 5c.

The three link mechanisms 4a, 4b, and 4c are arranged in a circumferential direction around center axis AX of the parallel link robot 1, and connect the base 2 and the movable part 3 to each other. The three actuators 5a, 5b, and 5c are located at the base 2 and drive the respective link mechanisms 4a, 4b, and 4c. The base 2, in the first embodiment, has a disc shape made up of: a circular top plate (not illustrated); and a container (not illustrated) containing the actuators 5a, 5b, and 5c. The actuators 5a, 5b, and 5c are located at a lower portion of the top plate. The movable part 3, in the first embodiment, has a disc shape, and includes an attachment receiver 20 at the lower end of the movable part 3. To the attachment receiver 20, an end effector (not illustrated) is attachable. Examples of the end effector include, but are not limited to, a robot hand, a welder, a coating gun, and a riveter.

The three link mechanisms 4a, 4b, and 4c have the same or similar configurations. The link mechanism 4a is connected to the actuator 5a, and includes a driving link 6a and two driven links 7a. The driven links 7a are connected to the driving link 6a and the movable part 3. Each driven link 7a of the two driven links 7a is connected to the driving link 6a via a spherical bearing 8a and connected to the movable part 3 via a spherical bearing 9a. The link mechanism 4b includes a driving link 6b and two driven links 7b. The driving link 6b is connected to the actuator 5b. The two driven links 7b are connected to the driving link 6b and the movable part 3. Each driven link 7b of the two driven links 7b is connected to the driving link 6b via a spherical bearing 8b and connected to the movable part 3 via a spherical bearing 9b. The link mechanism 4c includes a driving link 6c and two driven links 7c. The driving link 6c is connected to the actuator 5c. The two driven links 7c are connected to the driving link 6c and the movable part 3. Each driven link 7c of the two driven links 7c is connected to the driving link 6c via a spherical bearing 8c and connected to the movable part 3 via a spherical bearing 9c. The driving links 6a, 6b, and 6c are linear members that, as viewed from a direction along the center axis AX, radially extend from the center axis AX.

While in the above description the base 2 and the movable part 3 have circular shapes, the base 2 and the movable part 3 may have polygonal shapes such as triangular shapes, quadrangular shapes, and star shapes. Another possible example is that the base 2 is asymmetric with respect to the center axis AX, and the movable part 3 is asymmetric with respect to the center axis AX. Also, while in the first embodiment the actuators 5a, 5b, and 5c are contained in the base 2, the actuators 5a, 5b, and 5c may partially protrude out of the base 2.

Also, there is no particular limitation to the positions of the actuators 5a, 5b, and 5c. For example, the axes of the actuators 5a, 5b, and 5c may be located at equal distances from the center axis AX. For further example, at least one axis of the axes of the actuators 5a, 5b, and 5c may be located at a distance from the center axis AX, and the other axes of the actuators 5a, 5b, and 5c may be located at a different distance from the center axis AX. Also, there is no particular limitation to the orientations of the actuators 5a, 5b, and 5c. For example, as viewed from the direction along the center axis AX, the axes of the actuators 5a, 5b, and 5c may be pointed in directions orthogonal to the respective driving links 6a, 6b, and 6c (that is, the axes may be pointed in directions of tangents on a circle centered around the center axis AX). For further example, the axes of the actuators 5a, 5b, and 5c may be pointed in directions other than the tangent directions, which may be implemented by providing joints to the output shafts of the actuators 5a, 5b, and 5c.

Also, the spherical bearings 8a, 8b, and 8c will not be limited to ball joints. Other examples include, but are not limited to, rotary joints, universal joints, and prismatic joints. Also, each of the link mechanisms 4a, 4b, and 4c will not be limited to the two-link configuration (driving link and driven links) but may be made up of equal to or more than three kinds of links.

1-2. Schematic Configuration of Actuator

By referring to FIG. 2, an example schematic configuration of each of the actuators 5a, 5b, and 5c will be described. The actuators 5a, 5b, and 5c have similar configurations.

Figure 2:
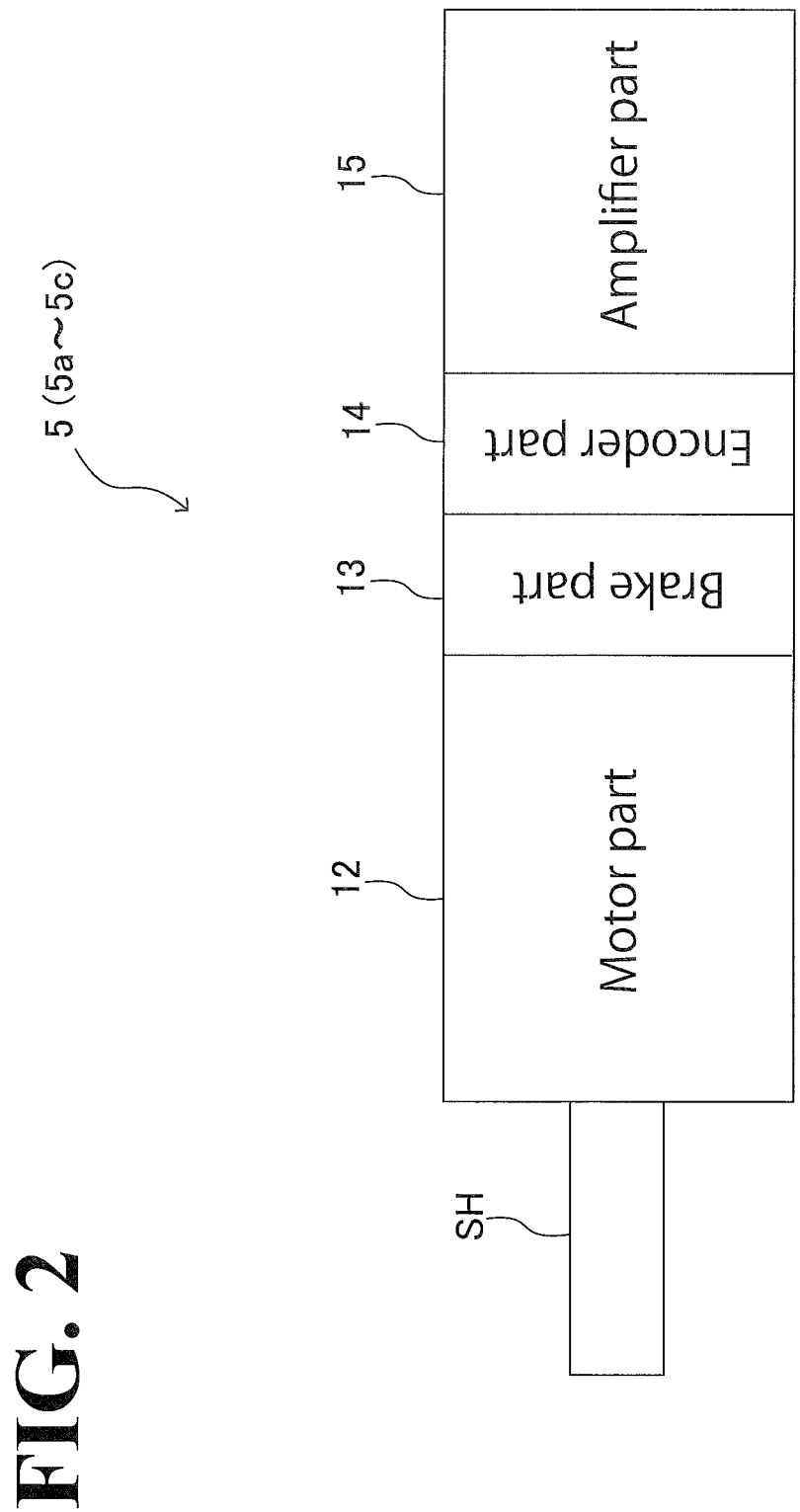
FIG. 2 is a schematic illustrating an example configuration of an actuator.

As illustrated in FIG. 2, the actuator 5 (5a, 5b, 5c) includes a motor part 12, a brake part 13, an encoder part 14, and an amplifier part 15. Thus, the actuator 5 is an amplifier-equipped motor.

The motor part 12 includes a stator and a rotor (which are not illustrated). That is, the motor part 12 is a rotary motor in which the rotor rotates relative to the stator. The motor part 12 rotates shaft SH.

The brake part 13 is located at the anti-load side of the motor part 12 (which is the side opposite to the shaft SH). The brake part 13 performs braking of the shaft SH.

The encoder part 14 is located at the anti-load side of the brake part 13. The encoder part 14 detects the position of the shaft SH (also referred to as the "angular position" or "rotational angle" of the shaft SH), and outputs position data indicating the detected position.

The amplifier part 15 is located at the anti-load side of the encoder part 14. The amplifier part 15 supplies power to the motor part 12. Specifically, the amplifier part 15 obtains the position data from the encoder part 14 and, based on the position data, controls current, voltage, or another form of energy to be applied to the motor part 12. In this manner, the amplifier part 15 controls a motion of the motor part 12. The amplifier part 15 may also obtain an upper-level control signal from an upper-level controller (not illustrated) to control a motion of the motor part 12 so that the rotational force output from the shaft SH corresponds to a position or another parameter specified by the upper-level control signal.

It is to be noted that the above-described configuration of the actuator 5 has been provided for exemplary purposes and is not intended in a limiting sense. For example, the brake part 13 and/or the encoder part 14 may be located at the load-side of the motor part 12 (which is the side of the shaft SH). For further example, the amplifier part 15 may be located between the motor part 12 and the brake part 13 or between the brake part 13 and the encoder part 14. For still further example, the actuator 5 may not necessarily include the brake part 13 and/or the encoder part 14.

1-3. Angular Arrangement of Three Link Mechanisms in Circumferential Direction

By referring to FIG. 3, an example angular arrangement of the three link mechanisms in a circumferential direction of the base 2 will be described.

Figure 3:
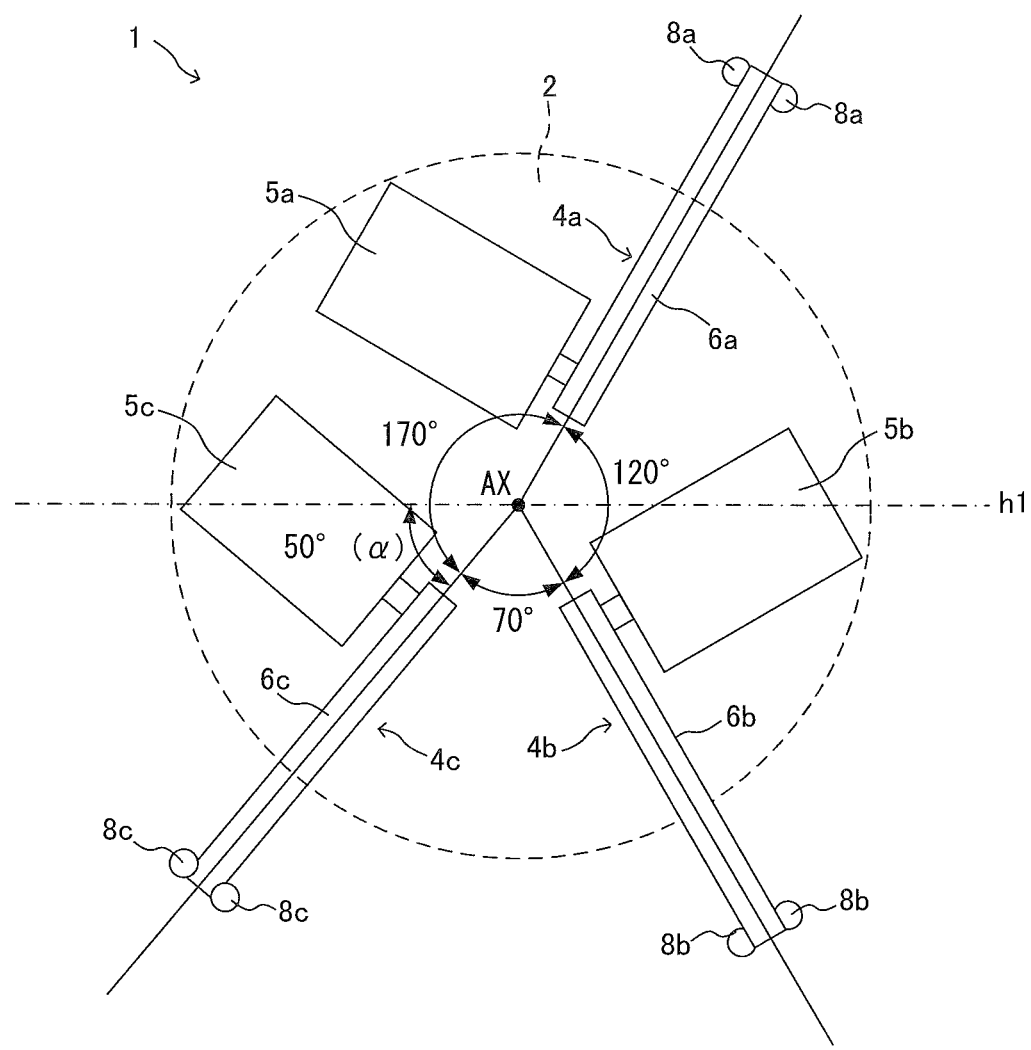
FIG. 3 illustrates an example angular arrangement between three, circumferentially arranged link mechanisms of the parallel link robot according to the first embodiment.

As illustrated in FIG. 3, the three link mechanisms 4a, 4b, and 4c respectively include the driving links 6a, 6b, and 6c. The driving links 6a, 6b, and 6c (which are non-limiting examples of the base-side ends recited in the appended claims) are base-side ends of the three link mechanisms 4a, 4b, and 4c and are arranged on the base 2 at different angular intervals in the circumferential direction. If the three link mechanisms 4a, 4b, and 4c were arranged in the circumferential direction at equal angular intervals, all the angular intervals would be 120° (degrees). In the parallel link robot 1 according to the first embodiment, the link mechanisms 4a and 4b are arranged in the circumferential direction at an angular interval having 120°, and the link mechanisms 4b and 4c are arranged in the circumferential direction at an angular interval having an angle different from 120° by an angle of a (without the a difference, the three link mechanisms 4a, 4b, and 4c would be arranged at equal angular intervals). As a result, the three link mechanisms 4a, 4b, and 4c are arranged such that the angular intervals between the three link mechanisms 4a, 4b, and 4c have: an angle of 120°; a larger angle that is larger than 120° by the angle $\alpha$; and a smaller angle that is smaller than 120° by the angle $\alpha$.

In the first embodiment, the angular interval between the link mechanism 4a and the link mechanism 4b in the circumferential direction is 120°, while the angular interval between the link mechanism 4b and the link mechanism 4c is different from 120° by 50° (if this angular interval were not different from 120°, all the intervals would be equal). As a result, the angular interval between the link mechanism 4a and the link mechanism 4b has an angle of 120°; the angular interval between the link mechanism 4a and the link mechanism 4c has an angle of 170°, which is larger than 120° by 50°; and the angular interval between the link mechanism 4b and the link mechanism 4c has an angle of 70°, which is smaller than 120° by 50°. That is, one of the three angular intervals has an acute angle smaller than 90°, and the other two angular intervals have obtuse angles larger than 90°.

With the three link mechanisms 4a, 4b, and 4c arranged at the above-described angular intervals, the actuators 5a, 5b, and 5c are arranged optimally. Specifically, the actuator 5a corresponds to the link mechanism 4a and is located at one side of the link mechanism 4a in the circumferential direction. The actuator 5b corresponds to the link mechanism 4b and is located at the one side of the link mechanism 4a in the circumferential direction. The actuator 5c corresponds to the link mechanism 4c and is located at the other side of the link mechanism 4c in the circumferential direction. As a result, the single actuator 5b is located between the link mechanism 4a and the link mechanism 4b, the two actuators 5a and 5c are located between the link mechanism 4a and the link mechanism 4c, and no actuator is located between the link mechanism 4b and the link mechanism 4c.

It is to be noted that the variable angle, $\alpha$, of the link mechanism 4c (the variable angle is a non-limiting example of the predetermined angle recited in the appended claims) will not be limited to 50°; any other angles determined in the following manner are possible. As illustrated in FIG. 3, a bisecting line h1 bisects the 120-degree angular interval between the link mechanisms 4a and 4b. The link mechanism 4c has a link-mechanism extending dimension extending from the center axis AX in the direction in which the bisecting line h1 extends (this direction will be hereinafter referred to as bisecting direction). The base 2 has a base extending dimension extending from the center axis AX in the bisecting direction. The variable angle $\alpha$ may be such an angle that the link-mechanism extending dimension and the base extending dimension are approximately identical to each other (see FIG. 5, described later). This configuration reduces the robot width of the parallel link robot 1 (the width of the parallel link robot 1 in the bisecting direction) while eliminating or minimizing an imbalance of load between the link mechanisms 4a, 4b, and 4c and eliminating or minimizing an increase in a dimension of the movable part 3 (namely, movable part diameter D, which will be described later by referring to FIGS. 4 and 6). This configuration will be described in more detail below.

Figure 4:
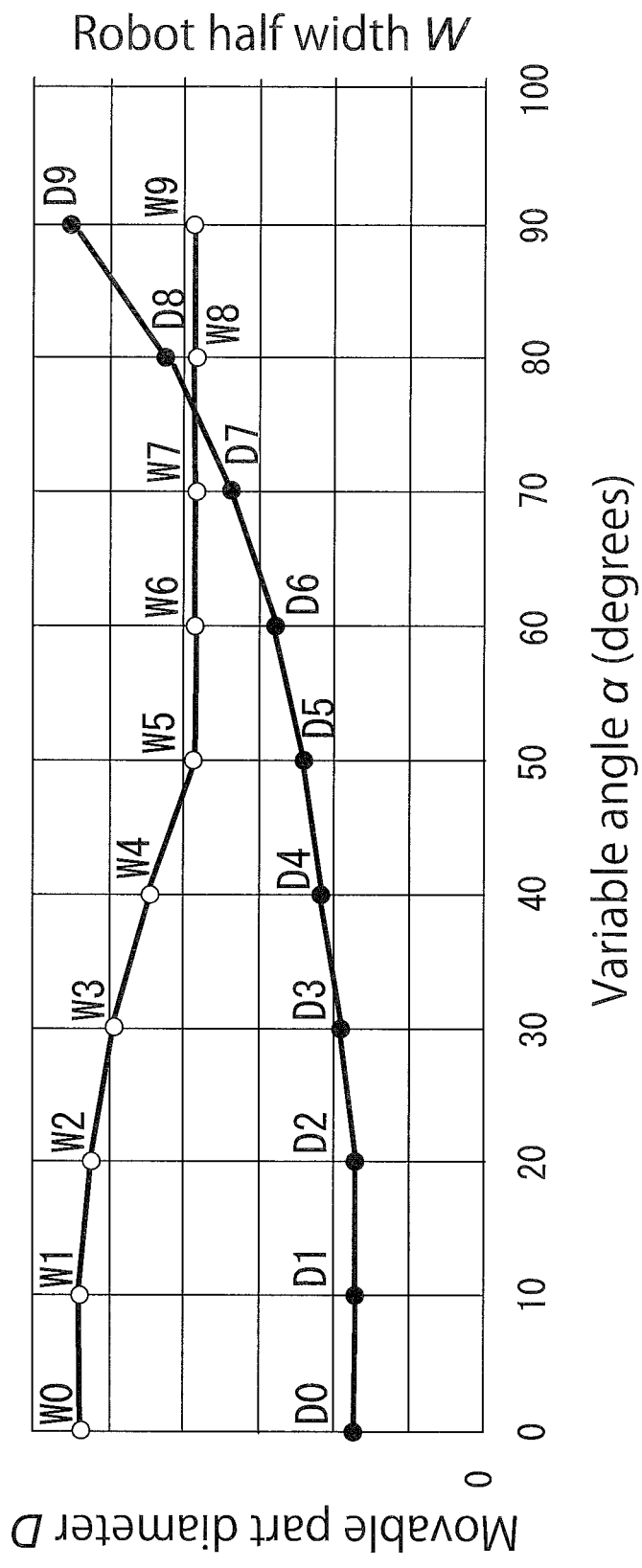
FIG. 4 is a graph showing an example relationship between: a link mechanism variable angle, which is variable to change an angular interval between link mechanisms; movable part diameter; and robot width (half width)
Figure 5:
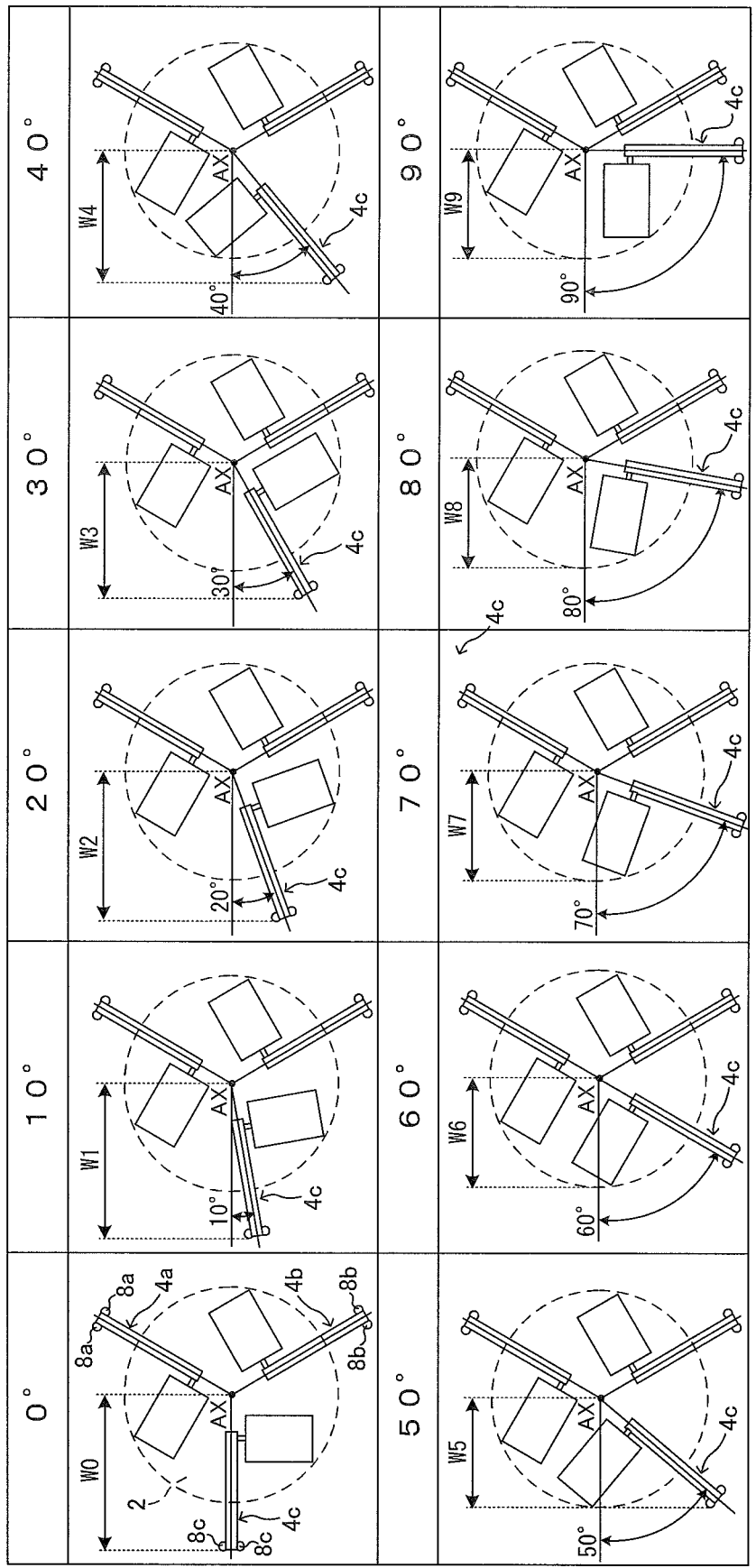
FIG. 5 is a schematic illustrating an example relationship between the variable angle and the robot width.
Figure 6:
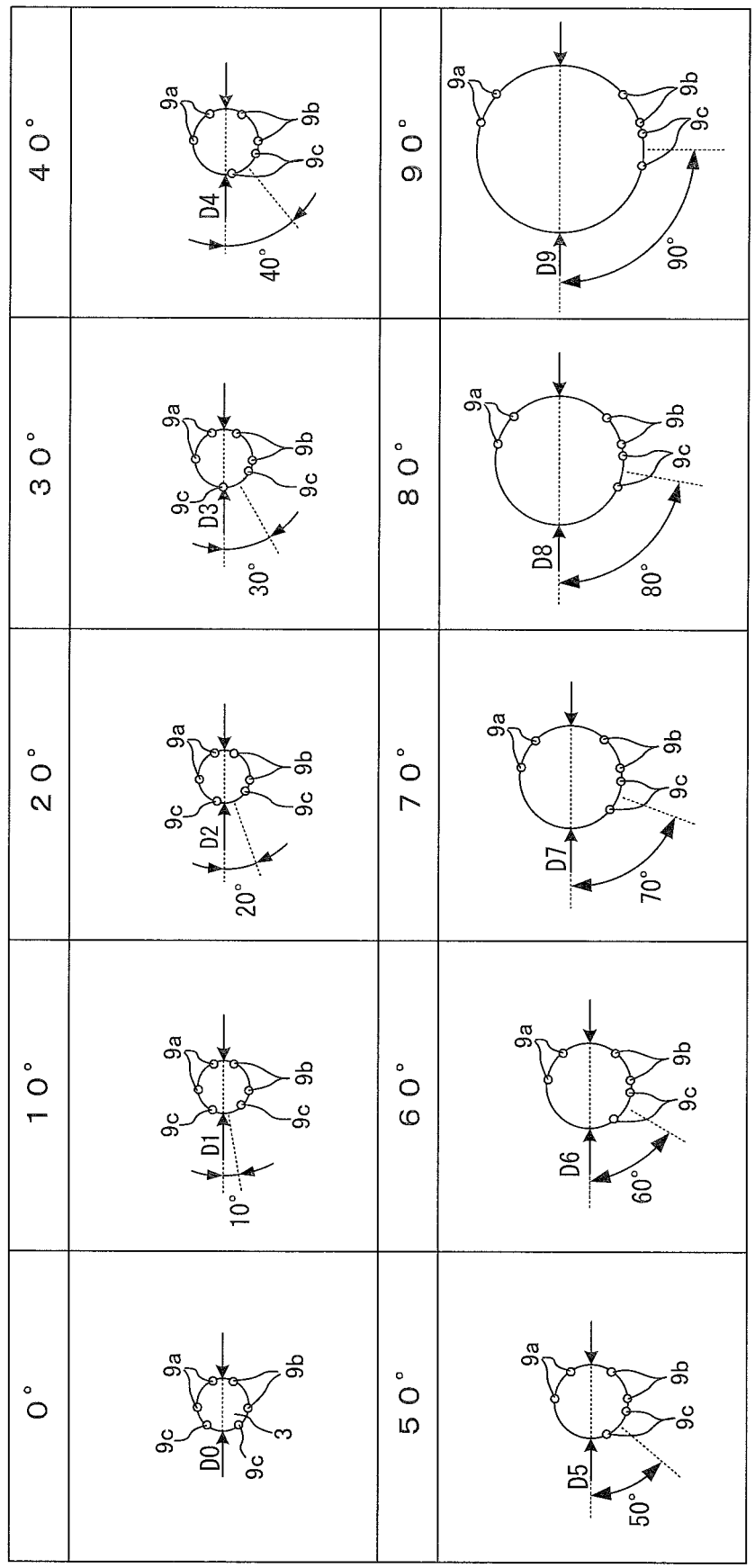
FIG. 6 is a schematic illustrating an example relationship between the variable angle and the movable part diameter.

1-4. Relationship Between Link Mechanism Variable Angle, Movable Part Diameter, and Robot Width By referring to FIGS. 4 to 6, description will be made with regard to an example relationship between link mechanism variable angle, movable part diameter, and robot width. FIG. 4 is a graph showing an example relationship between: the variable angle $\alpha$ of the link mechanism 4c; the diameter D of the movable part 3; and robot half width W. FIG. 5 is a schematic illustrating an example relationship between the variable angle $\alpha$ of the link mechanism 4c and the robot half width W. FIG. 6 is a schematic illustrating an example relationship between the variable angle $\alpha$ of the link mechanism 4c and the diameter D of the movable part 3. It is to be noted that the robot half width W is defined as an extending dimension extending from the center axis AX in the bisecting direction, which is the direction toward the side on which the link mechanism 4c is located.

As illustrated in FIGS. 4 and 5, when the variable angle $\alpha$ of the link mechanism 4c is 0°, all the angular intervals between the three link mechanisms 4a, 4b, and 4c are 120°. Specifically, the link mechanism 4c is located on the bisecting line h1 (see FIG. 3), and protrudes from the base 2 in the bisecting direction. In this case, the robot half width W is W0, which is the link-mechanism extending dimension of the link mechanism 4c (the link-mechanism extending dimension is the link mechanism 4c's dimension extending from the center axis AX in the bisecting direction).

The link mechanism 4c's link-mechanism extending dimension (extending from the center axis AX in the bisecting direction) gradually decreases as the variable angle α of the link mechanism 4c increases from 0° to 10°, 20°, 30°, 40°, and 50°. That is, the robot half width W decreases in the order of: W1, W2, W3, W4, and W5 (W1>W2>W3>W4>W5). When the variable angle α is 50°, the link-mechanism extending dimension of the link mechanism 4c is approximately identical to the base extending dimension of the base 2 (the base extending dimension is the base 2's dimension extending from the center axis AX in the bisecting direction). That is, the robot half width W is W5, which is approximately identical to the base extending dimension of the base 2.

Beyond 50°, that is, when the variable angle α increases to 60°, 70°, 80°, and 90°, the base extending dimension of the base 2 is larger than the link-mechanism extending dimension of the link mechanism 4c. That is, the robot half widths W6, W7, W8, and W9 are approximately identical to and do not decrease below W5 (W5≈W6≈W7≈W8≈W9).

In the example illustrated in FIG. 5, the actuator 5c is located at the opposite side of the link mechanism 4c in the circumferential direction when the variable angle α is 40° and larger. This arrangement is for the purpose of avoiding an interference between the actuator 5c and the link mechanism 4b.

As illustrated in FIGS. 4 and 6, when the variable angle α of the link mechanism 4c is 0°, 10°, and 20°, there is no interference between the spherical bearing 9c of the link mechanism 4c and the spherical bearing 9b of the link mechanism 4b (the spherical bearing 9b is next to the spherical bearing 9c) without changing the movable part diameter D. Thus, the movable part diameter D remains unchanged (D0≈D1≈D2). When the variable angle α is in excess of 20°, however, it is preferable to increase the movable part diameter D in order to keep the spherical bearing 9c and the spherical bearing 9b sufficiently apart from each other to avoid an interference between the spherical bearing 9c and the spherical bearing 9b. In the first embodiment, as the variable angle α increases to 30°, 40°, 50°, 60°, 70°, 80°, and 90°, the movable part diameter D gradually increases in the order of: D3, D4, D5, D6, D7, D8, and D9 (D3<D4<D5<D6<D7<D8<D9).

Thus, as the variable angle α of the link mechanism 4c is larger, the link-mechanism extending dimension of the link mechanism 4c is smaller. When, however, the variable angle α is 50° or larger, the base extending dimension of the base 2 is larger than the link-mechanism extending dimension of the link mechanism 4c. That is, even if the variable angle α increases to 50° or larger, the width of the parallel link robot 1 cannot be reduced any further.

From the viewpoint of a balance of load between the link mechanisms 4a, 4b, and 4c, it is most preferable that the link mechanisms 4a, 4b, and 4c be arranged at equal 120-degree angular intervals and that the variable angle α of the link mechanism 4c be as small as possible. Also, as the variable angle α of the link mechanism 4c is larger, the dimension (movable part diameter D) of the movable part 3 is larger, which is for avoidance of an interference between the spherical bearings 9c and 9b (which are next to each other). From the viewpoint of a reduction in the size of the movable part 3 as well, it is preferable that the variable angle α be as small as possible.

In light of these considerations, when the variable angle α of the link mechanism 4c is 50°, the base extending dimension of the base 2 and the link-mechanism extending dimension of the link mechanism 4c are approximately identical to each other. This configuration reduces the width of the parallel link robot 1 while eliminating or minimizing an imbalance of load between the link mechanisms 4a, 4b, and 4c and eliminating or minimizing an increase in the dimension D of the movable part 3.

1-5. Configuration of Parallel Link Robot System

By referring to FIGS. 7 and 8, description will be made with regard to: a configuration of a parallel link robot system 10, which uses the parallel link robot 1; and a configuration of a parallel link robot system 10', which uses a parallel link robot according to a comparative example.

Figure 7:
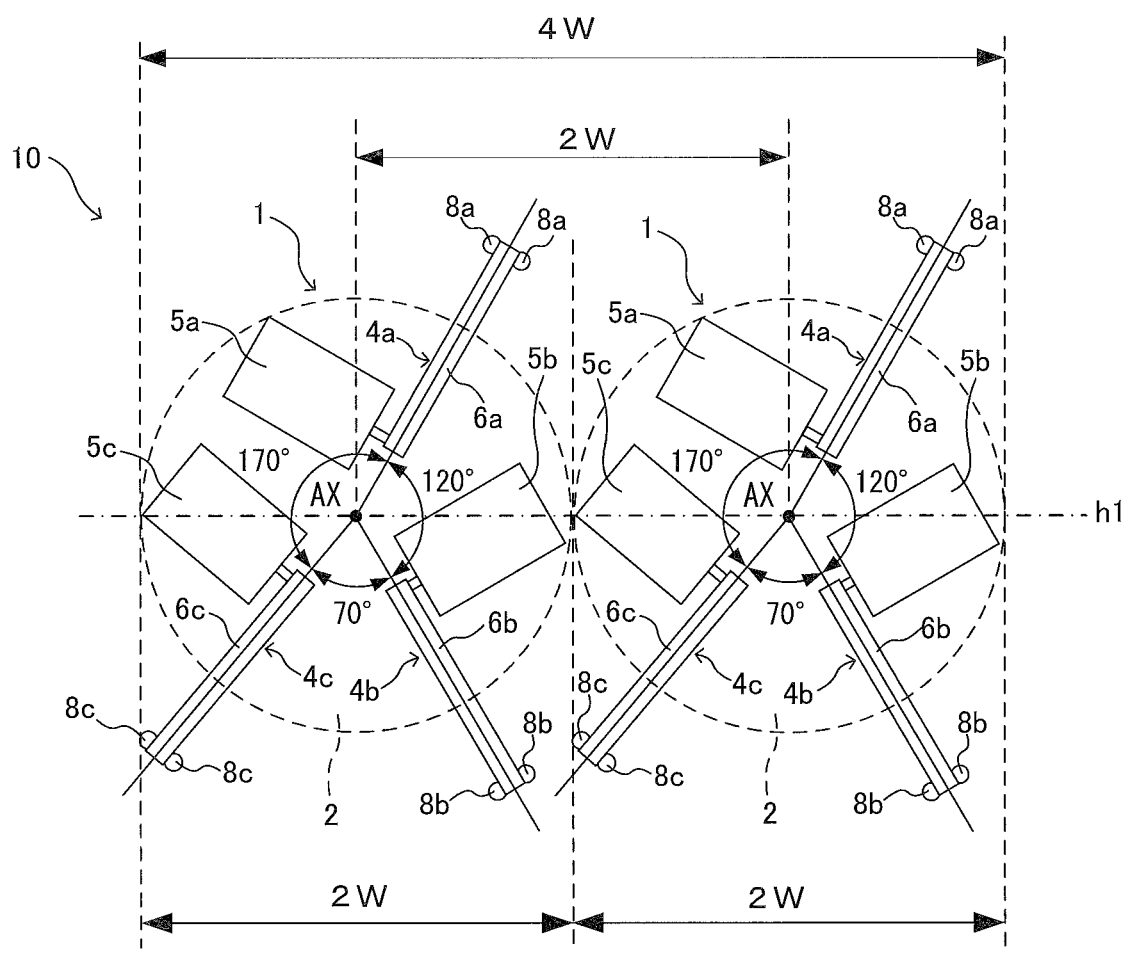
FIG. 7 illustrates an example configuration of a parallel link robot system that uses the parallel link robot according to the first embodiment.

As illustrated in FIG. 7, the parallel link robot system 10 according to the first embodiment includes two parallel link robots 1. It is to be noted that the parallel link robot system 10 may include three or more parallel link robots 1. The three link mechanisms 4a, 4b, and 4c of each parallel link robot 1 of the two parallel link robots 1 respectively include the driving links 6a, 6b, and 6c (which are non-limiting examples of the base-side ends recited in the appended claims). The driving links 6a, 6b, and 6c are arranged on the base 2 at angular intervals in the circumferential direction around the center axis AX. Specifically, the angle of the angular interval between the link mechanisms 4a and 4b is 120°; the angle of the angular interval between the link mechanisms 4b and 4c is 70°; and the angle of the angular interval between the link mechanisms 4c and 4a is 170°. The two parallel link robots 1 are oriented in such postures that the three link mechanisms 4a, 4b, and 4c of the two parallel link robots 1 are arranged in an approximately identical manner in the circumferential direction. Also, the two parallel link robots 1 are arranged next to each other in the bisecting direction. In other words, the two parallel link robots 1 are aligned with the center axes AX of the two parallel link robots 1 located on the bisecting line h1 such that the link mechanisms 4a of the two parallel link robots 1 are parallel to each other, that the link mechanisms 4b of the two parallel link robots 1 are parallel to each other, and that the link mechanisms 4c of the two parallel link robots 1 are parallel to each other.

As illustrated in FIG. 7, the width of the parallel link robot 1 in the bisecting direction is 2W, which is twice the robot half width W. That is, the two parallel link robots 1 are arranged with a pitch of 2W between the center axes AX of the two parallel link robots 1, and the width of the parallel link robot system 10 as a whole is 4W.

It is to be noted that in the parallel link robot system 10, there is no particular limitation to a control system for the plurality of parallel link robots 1. For example, it is possible to use a common controller to control the plurality of parallel link robots 1. Alternatively, it is possible to use different controllers to control the respective parallel link robots 1. In the case of different controllers, it is possible to cause the plurality of parallel link robots 1 to make different motions. Alternatively, it is possible to cause the plurality of parallel link robots 1 to make identical motions, which may be implemented by, for example, transmitting operation information from one controller to the other controller.

Figure 8:
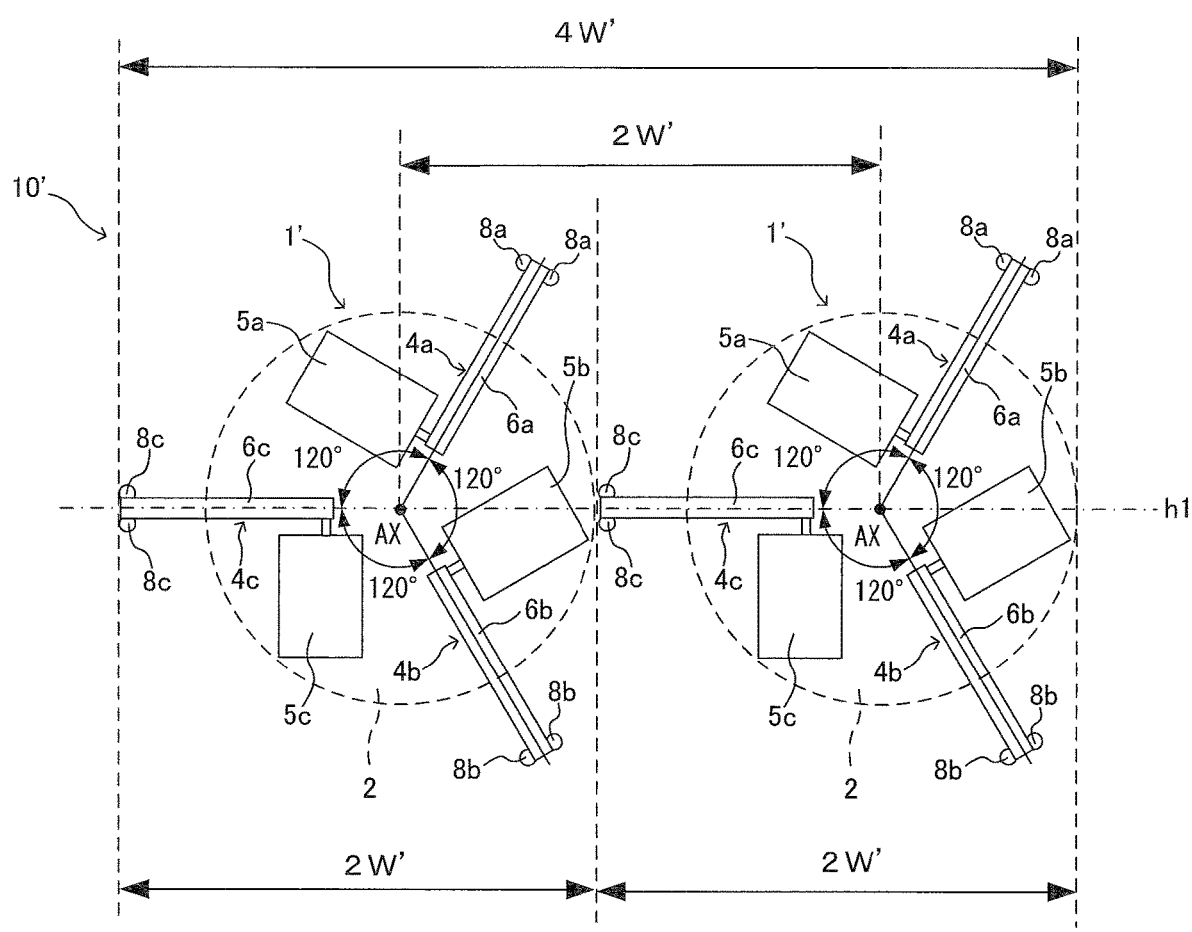
FIG. 8 illustrates an example configuration of a parallel link robot system that uses a parallel link robot according to a comparative example.

As illustrated in FIG. 8, the parallel link robot system 10' according to the comparative example includes two parallel link robots 1'. Each parallel link robot 1' of the two parallel link robots 1' includes three link mechanisms 4a, 4b, and 4c. The three link mechanisms 4a, 4b, and 4c respectively include driving links 6a, 6b, and 6c (which are base-side ends of the respective three link mechanisms 4a, 4b, and 4c). The driving links 6a, 6b, and 6c are arranged on the base 2 at equal angular intervals (120-degree angular intervals) around the center axis AX in a circumferential direction of the base 2. The two parallel link robots 1' are oriented in such postures that the three link mechanisms 4a, 4b, and 4c of the two parallel link robots 1' are arranged in an approximately identical manner in the circumferential direction. Also, the two parallel link robots 1' are arranged next to each other in a bisecting direction in which a bisecting line h1 bisecting the 120-degree angular interval between the link mechanisms 4a and 4b extends.

As illustrated in FIG. 8, the link mechanisms 4c of the parallel link robots 1' are located on the bisecting line h1 and thus protrude over so large a width in the width direction from the base 2 that the width of the parallel link robot in the bisecting direction is 2W', which is larger than the width 2W of the parallel link robot 1 according to the first embodiment. With this configuration, the two parallel link robots are arranged with a pitch of 2W' between the center axes AX of the two parallel link robots 1, and the width of the robot system 10' as a whole is 4W', which is much larger than the width 4W of the parallel link robot system 10 according to the first embodiment.

Thus, the parallel link robot 1 according to the first embodiment has a smaller width than the width of the parallel link robot 1' according to the comparative example, occupying a smaller amount of space. Since the parallel link robot system 10 according to the first embodiment has an advantageously smaller width than the width of the parallel link robot system 10' according to the comparative example, the occupation space of the parallel link robot system 10 as a whole decreases advantageously. The downsizing effect of a parallel link robot system is more notably appreciated as the number of robots increases.

It is to be noted that the plurality of parallel link robots 1 of the parallel link robot system 10 may not necessarily have approximately the same size. Insofar as the angular intervals between the three link mechanisms 4a, 4b, and 4c are common to the plurality of parallel link robots 1, the plurality of parallel link robots 1 may have different sizes (for example, similarity shapes of different sizes). In this case as well, the above-described downsizing effect can be appreciated. Also, not all the plurality of parallel link robots of the parallel link robot system 10 may necessarily be parallel link robots 1 according to the first embodiment. For example, the plurality of parallel link robots of the parallel link robot system 10 may be a combination of parallel link robots 1 according to the first embodiment and parallel link robots 1' according to the comparative example. In this case as well, the occupation space of the parallel link robot system 10 decreases as compared with the cases where all the plurality of parallel link robots of the parallel link robot system are parallel link robots 1' according to the comparative example.

1-6. Advantageous Effects of First Embodiment

As has been described hereinbefore, the parallel link robot 1 according to the first embodiment includes the base 2, the movable part 3, the three link mechanisms 4a, 4b, and 4c, and the three actuators 5a, 5b, and 5c. To the movable part 3, an end effector is attachable. The three link mechanisms 4a, 4b, and 4c connect the base 2 and the movable part 3 to each other. The three link mechanisms 4a, 4b, and 4c respectively include the driving links 6a, 6b, and 6c. The driving links 6a, 6b, and 6c (which are non-limiting examples of the base-side ends recited in the appended claims) are base-side ends of the three link mechanisms 4a, 4b, and 4c and are arranged on the base 2 at different angular intervals in a circumferential direction of the base 2 around the center axis AX. The three actuators 5a, 5b, and 5c are located at the base 2 and are configured to drive the respective three link mechanisms 4a, 4b, and 4c. This configuration provides advantageous effects, examples of which are described below.

As described above, in the parallel link robot 1' according to the comparative example, the three link mechanisms 4a, 4b, and 4c are arranged at equal angular intervals (120-degree angular intervals). With this configuration, the link mechanisms 4a, 4b, and 4c inevitably protrude outward, no matter how the link mechanisms 4a, 4b, and 4c are oriented around the center axis AX. This makes it difficult to reduce the amount of occupation space of the parallel link robot 1'.

In the first embodiment, the three link mechanisms 4a, 4b, and 4c are arranged at different angular intervals. Specifically, the angular intervals are optimized to reduce the width of the parallel link robot 1 in a predetermined direction (in the first embodiment, the width of the parallel link robot 1 in the bisecting direction). This reduces the occupation space of the parallel link robot 1.

Also in the first embodiment, the angular intervals include: a 120-degree angular interval having 120°; a larger angular interval having a larger angle that is larger than 120° by the variable angle $\alpha$; and a smaller angular interval having a smaller angle that is smaller than 120° by the variable angle $\alpha$.

Specifically, in the first embodiment, the two link mechanisms 4a and 4b (among the three link mechanisms 4a, 4b, and 4c) remain arranged at an angular interval of 120°, and the other link mechanism 4c is arranged at an angular interval different from the 120-degree angular interval by a predetermined angle. This reduces the width of the parallel link robot 1 in a predetermined direction (the bisecting direction), resulting in a reduction in the occupation space of the parallel link robot 1.

Also in the first embodiment, one of the three angular intervals is the conventional 120-degree angular interval. With the parallel link robot 1's capability of transferring objects taken into consideration, it is necessary to maintain a balance of load between the link mechanisms 4a, 4b, and 4c. For this purpose, it is most preferable that the link mechanisms 4a, 4b, and 4c be arranged at equal 120-degree angular intervals. In light of this, one of the angular intervals has 120° in the first embodiment. This configuration eliminates or minimizes degradation of the parallel link robot 1's capability of transferring objects as compared with the cases where all the angular intervals are different from each other (for example, as compared with the case where the angular intervals are a 180-degree angular interval, a 90-degree angular interval, and a 90-degree angular interval). That is, the above configuration eliminates or minimizes an imbalance of load.

Also in the first embodiment, the two link mechanisms 4a and 4b (among the three link mechanisms 4a, 4b, and 4c) remain arranged in a conventional manner, while the other link mechanism 4c is arranged in a different manner. This minimizes the need for changing the design of a general-purpose product as compared with the cases where it is necessary to change the arrangement of equal to or more than two link mechanisms (for example, to obtain a 180-degree angular interval, a 90-degree angular interval, and a 90-degree angular interval). As a result, the cost associated with the three link mechanisms 4a, 4b, and 4c decreases.

Also in the first embodiment, the variable angle $\alpha$ is such an angle that the link-mechanism extending dimension of the link mechanism 4c and the base link-mechanism of the base 2 are approximately identical to each other. This configuration provides advantageous effects, examples of which are described below.

As the variable angle α of the link mechanism 4c is larger, the link-mechanism extending dimension of the link mechanism 4c is smaller. When, however, the variable angle α is a predetermined angle or larger, the base extending dimension of the base 2 is larger than the link-mechanism extending dimension of the link mechanism 4c. That is, even if the variable angle α increases to the predetermined angle or larger, the width of the parallel link robot 1 cannot be reduced any further.

From the viewpoint of a balance of load between the link mechanisms 4a, 4b, and 4c, it is most preferable that the link mechanisms 4a, 4b, and 4c be arranged at equal 120-degree angular intervals and that the variable angle α of the link mechanism 4c be as small as possible. Also, as the variable angle α of the link mechanism 4c is larger, the dimension (movable part diameter D) of the movable part 3 is larger, which is for avoidance of an interference between the spherical bearings 9c and 9b (which are next to each other). In light of this, it is preferable that the variable angle α be as small as possible.

In light of these considerations, the predetermined angle is such an angle that the base extending dimension of the base 2 and the link-mechanism extending dimension of the link mechanism 4c are approximately identical to each other. This configuration minimizes the width of the parallel link robot 1 while eliminating or minimizing an imbalance of load between the link mechanisms 4a, 4b, and 4c and eliminating or minimizing an increase in the width of the movable part 3.

Also in the first embodiment, the angular intervals have 120°, 170°, and 70°. This ensures an optimal balance between a reduction in the size of the parallel link robot 1 and the parallel link robot 1's capability of transferring objects. This, in turn, minimizes the width of the parallel link robot 1 while eliminating or minimizing an imbalance of load between the link mechanisms 4a, 4b, and 4c and eliminating or minimizing an increase in the width of the movable part 3.

Also in the first embodiment, the actuator 5 (5a, 5b, 5c) includes the motor part 12 and the amplifier part 15. The amplifier part 15 is integral to the motor part 12 and supplies power to the motor part 12. This configuration eliminates the need for a connection cable that is otherwise necessary in applications where the actuator and the amplifier part are separate from each other. Thus, the above configuration is a wiring-saved configuration and an easy-to-install configuration.

Also, the parallel link robot system 10 according to the first embodiment includes a plurality of parallel link robots 1. The plurality of parallel link robots 1 are oriented in such postures that the three link mechanisms 4a, 4b, and 4c of the plurality of respective are arranged in an approximately identical manner in the circumferential direction. Also, the plurality of parallel link robots 1 are arranged next to each other in the bisecting direction.

Specifically, the parallel link robot system 10 includes two parallel link robots 1. The two parallel link robots 1 are arranged next to each other in a direction in which the widths of the two parallel link robots 1 decrease (this direction is the bisecting direction). This reduces the dimension of the parallel link robot system 10 in the bisecting direction to an advantageously smaller dimension, resulting in a smaller amount of occupation space of the parallel link robot system 10.

Also in the first embodiment, the two parallel link robots 1 are oriented in identical postures. This facilitates the installment work of the two parallel link robots 1 as compared with the cases where the two parallel link robots are oriented in different postures; for example, as compared with the case where the angular intervals in each of the parallel link robots are a 180-degree angular interval, a 90-degree angular interval, and a 90-degree angular interval, the two parallel link robots are arranged with the 180° angular intervals of the two parallel link robots facing each other. In this case of different postures, it is inherent that the parallel link robots be installed in pairs, resulting in an even number of parallel link robots. In the first embodiment, however, there is no limitation to the number of parallel link robots to be installed, resulting in an improved degree of freedom of robot system design.

2. Second Embodiment

A second embodiment will be described by referring to the accompanying drawings. The following description will mainly focus on respects different from the first embodiment, omitting respects similar or identical to the first embodiment.

2-1. Angular Arrangement of Three Link Mechanisms in Circumferential Direction

By referring to FIG. 9, an example angular arrangement of the three link mechanisms in a circumferential direction of the base will be described.

A parallel link robot 1A according to the second embodiment includes the base 2, the movable part 3, the three link mechanisms 4a, 4b, and 4c, and the three actuators 5a, 5b, and 5c, similarly to the parallel link robot 1 according to the first embodiment.

Figure 9:
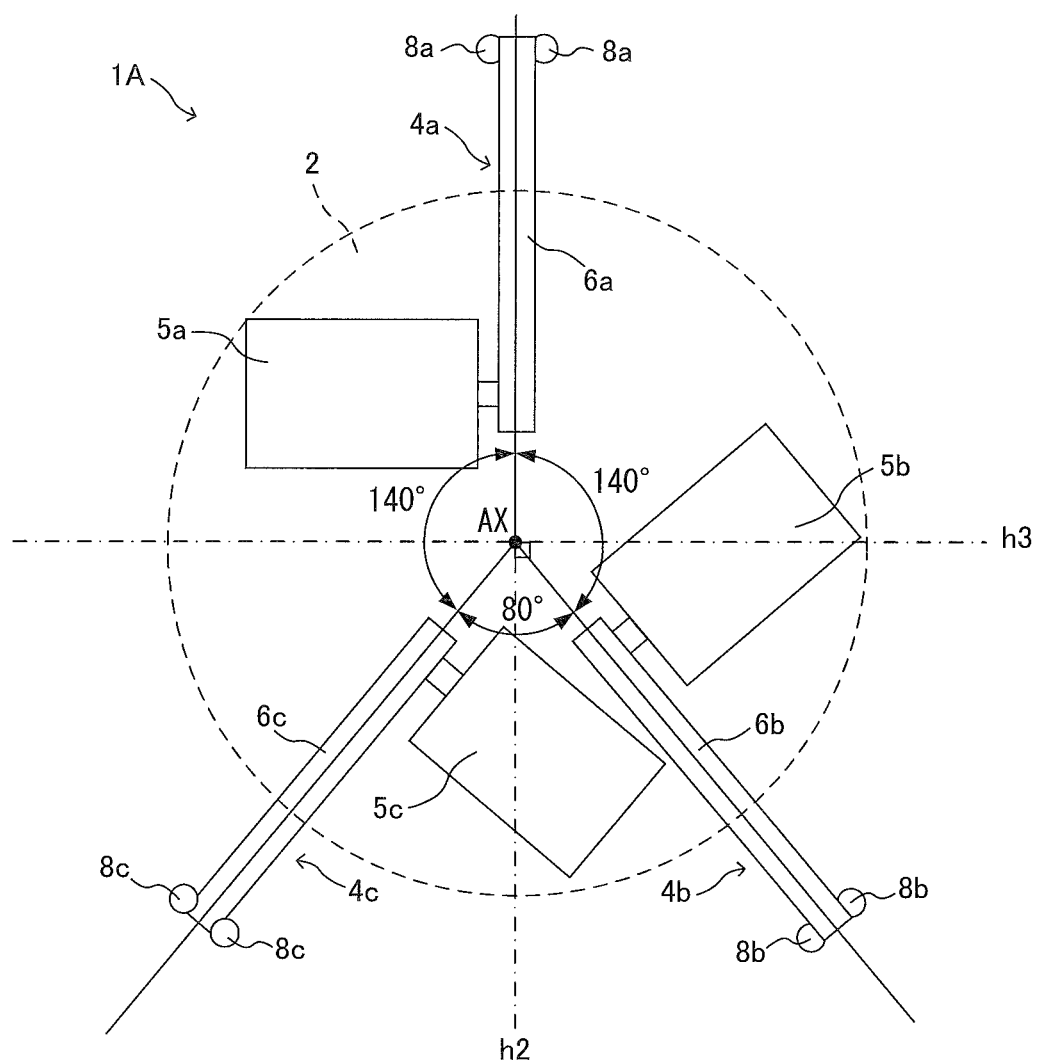
FIG. 9 illustrates an example angular arrangement of three, circumferentially arranged link mechanisms of a parallel link robot according to a second embodiment.

As illustrated in FIG. 9, the three link mechanisms 4a, 4b, and 4c respectively include the driving links 6a, 6b, and 6c. The driving links 6a, 6b, and 6c (which are non-limiting examples of the base-side ends recited in the appended claims) are base-side ends of the three link mechanisms 4a, 4b, and 4c and are arranged on the base 2 at different angular intervals in the circumferential direction. One of the angular intervals has an acute angle smaller than 90°. The other two angular intervals have obtuse angles larger than 90°, and these obtuse angles are equal to each other. That is, the three link mechanisms 4a, 4b, and 4c are arranged approximately in the form of Y, as viewed from the direction along the center axis AX.

In the second embodiment, the angle between the link mechanism 4a and the link mechanism 4b is 140°, the angle between the link mechanism 4a and the link mechanism 4c is equally 140°, and the angle between the link mechanism 4b and the link mechanism 4c is 80°.

In the second embodiment, as illustrated in FIG. 9, the actuator 5a corresponds to the link mechanism 4a and is located at one side of the link mechanism 4a in the circumferential direction. The actuator 5b corresponds to the link mechanism 4b and is located at the one side of the link mechanism 4a in the circumferential direction. The actuator 5c corresponds to the link mechanism 4c and is located at one side of the link mechanism 4c in the circumferential direction. It is to be noted that this arrangement of the actuators 5a, 5b, and 5c may be adjusted if there is a more optimal arrangement in light of the above-described angular intervals. For example, it is possible to arrange the actuator 5c at the other side of the corresponding link mechanism 4c in the circumferential direction.

It is to be noted that the acute angle of the one angular interval will not be limited to 80°; any other angles determined in the following manner are possible. As illustrated in FIG. 9, a bisecting line h2 bisects the acute-angle angular interval. A normal line h3 is perpendicular to the bisecting line h2. The link mechanisms 4b and 4c have link-mechanism extending dimensions extending from the center axis AX in the directions in which the normal line h3 extends (the normal line h3 directions). The base 2 has base extending dimensions extending from the center axis AX in the normal line h3 directions. The acute angle may be such an angle that the base extending dimensions are approximately identical to the link-mechanism extending dimensions (see FIG. 10, described later). This configuration reduces the robot width of the parallel link robot 1A (the width of the parallel link robot 1A in the normal line h3 direction) while eliminating or minimizing an imbalance of load between the link mechanisms 4a, 4b, and 4c and eliminating or minimizing an increase in a dimension of the movable part 3 (namely, movable part diameter D, which will be described later by referring to FIG. 11). This configuration will be described in more detail below.

Figure 10:
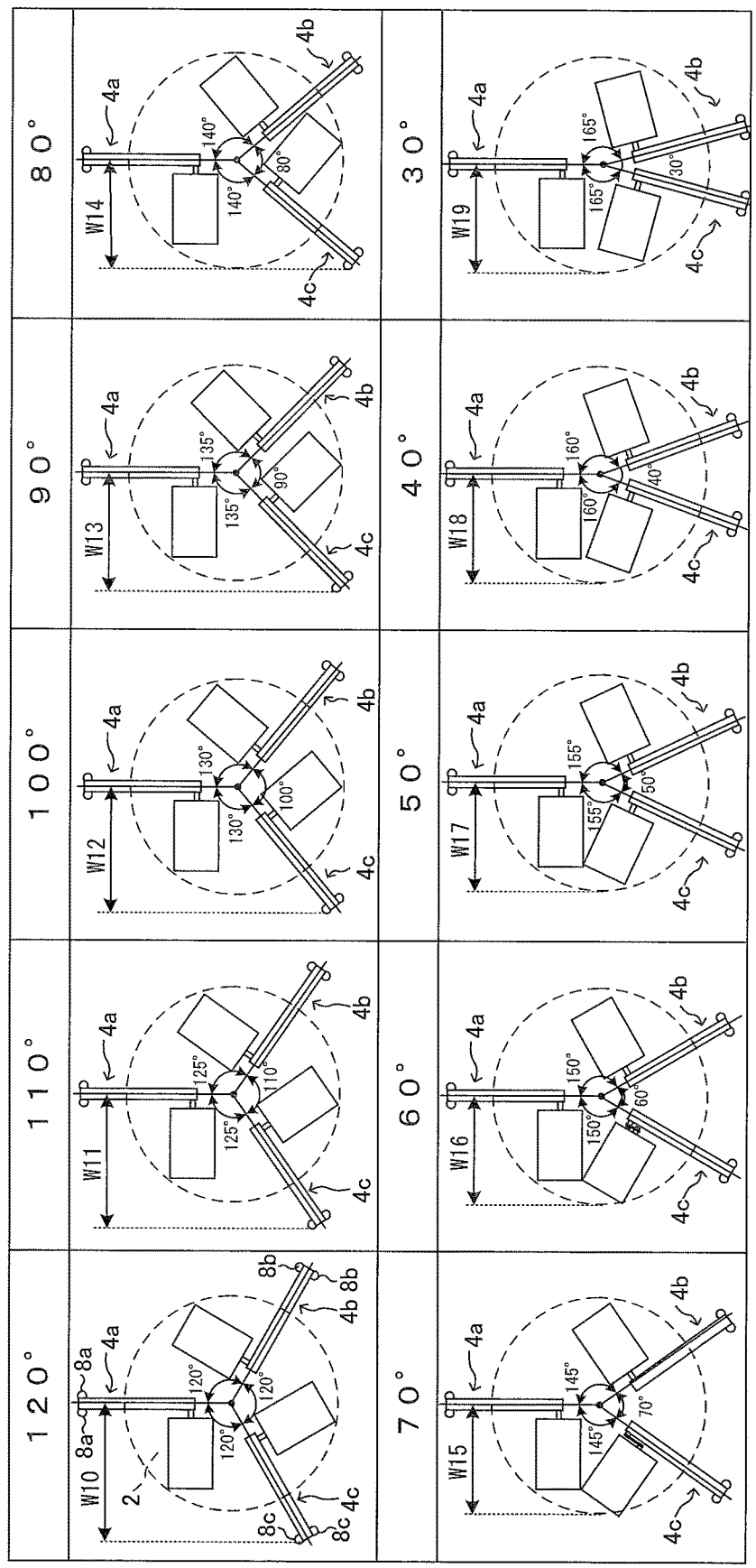
FIG. 10 is a schematic illustrating an example relationship that the angular intervals between the link mechanisms have with robot width (half width)
Figure 11:
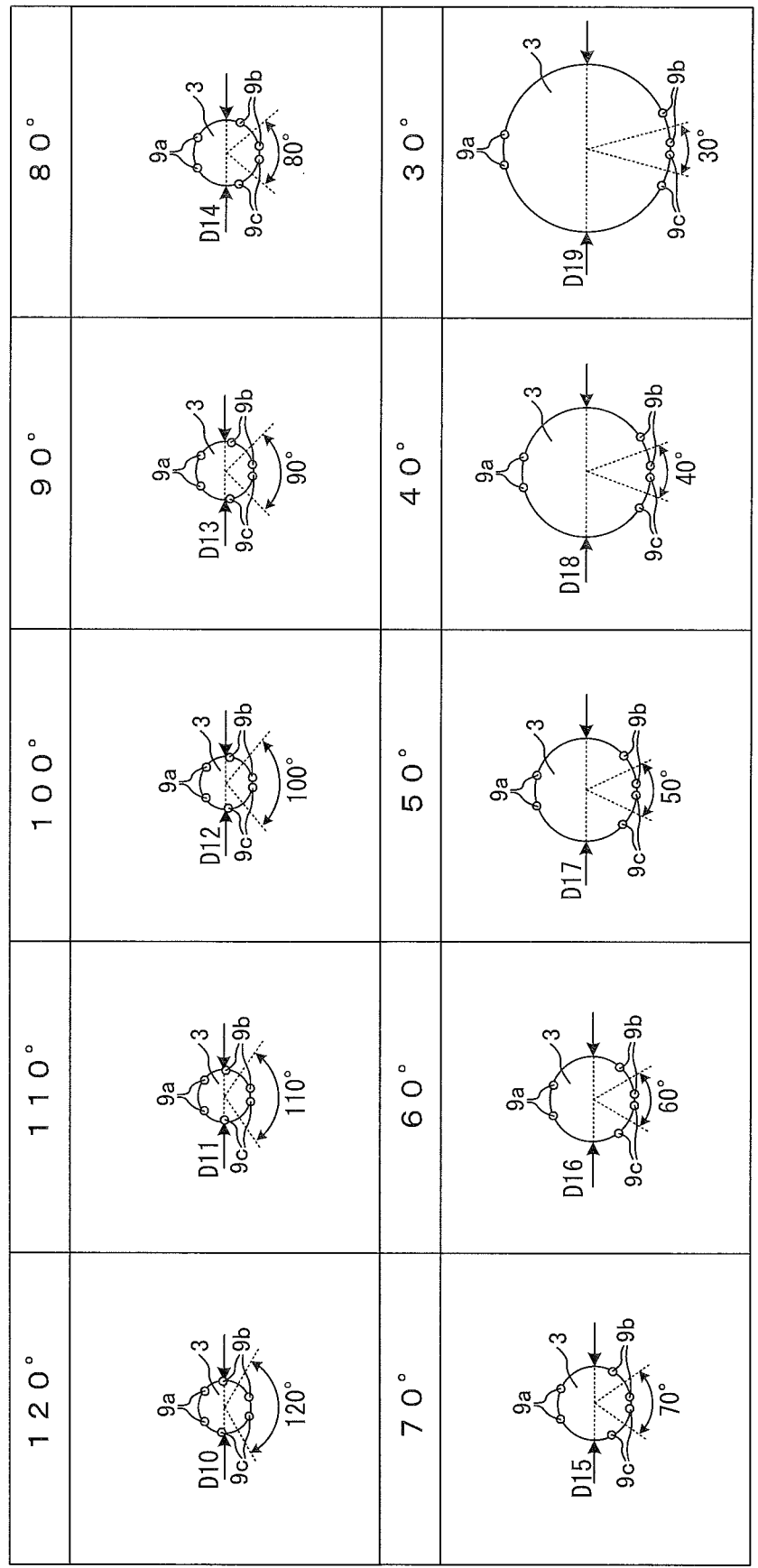
FIG. 11 is a schematic illustrating an example relationship that the angular intervals between the link mechanisms have with movable part diameter.

2-2. Relationship that Angular Intervals Between Link Mechanisms have with Movable Part Diameter and Robot Width By referring to FIGS. 10 and 11, description will be made with regard to an example relationship that the angular intervals between the link mechanisms have with movable part diameter and robot width. FIG. 10 is a schematic illustrating an example relationship that the angular intervals between the link mechanisms 4b and 4c have with the robot half width W. FIG. 11 is a schematic illustrating an example relationship that the angular intervals between the link mechanisms 4b and 4c have with the diameter D of the movable part 3. It is to be noted that the robot half width W is defined as an extending dimension extending from the center axis AX in one of the normal line h3 directions, which is the direction toward the side on which the link mechanism 4c is located.

As illustrated in FIG. 10, when the angle between the link mechanisms 4b and 4c is 120°, the other two angular intervals have 120°, too. That is, the three link mechanisms 4a, 4b, and 4c are arranged at equal angular intervals in the circumferential direction. In this case, the robot half width W is W10, which is equivalent to the link mechanism 4c's link-mechanism extending dimension extending from the center axis AX in the one of the normal line h3 directions. Also, the link mechanism 4b's link-mechanism extending dimension extending from the center axis AX in the other one of the normal line h3 directions is W10.

The link mechanism 4c's link-mechanism extending dimension extending from the center axis AX in the one of the normal line h3 directions gradually decreases as the angle between the link mechanisms 4b and 4c decreases from 120° to 110°, 100°, 90°, and 80°. Specifically, the robot half width W decreases in the order of: W10, W11, W12, W13, and W14 (W10>W11>W12>W13>W14). When the angle between the link mechanisms 4b and 4c is 80°, the link mechanism 4c's link-mechanism extending dimension extending from the center axis AX in the one of the normal line h3 directions is approximately identical to the base 2's base extending dimension extending from the center axis AX in the one of the normal line h3 directions. Specifically, the robot half width W is W14, which is approximately identical to the base 2's base extending dimension extending from the center axis AX in the one of the normal line h3 directions. Also, the link mechanism 4b's link-mechanism extending dimension extending from the center axis AX in the other one of the normal line h3 directions is W14.

Below 80°, that is, when the angle between the link mechanisms 4b and 4c decreases to 70°, 60°, 50°, 40°, and 30°, the base extending dimension of the base 2 is larger than the link-mechanism extending dimension of the link mechanism 4c. That is, the robot half widths W15, W16, W17, W18, and W19 are approximately identical to and do not decrease below W14 (W14≈W15≈W16≈W17≈W18≈W19).

In the example illustrated in FIG. 10, the actuator 5c is located at the opposite side of the link mechanism 4c in the circumferential direction when the angle between the link mechanisms 4b and 4c is 70° or smaller. This arrangement is for the purpose of avoiding an interference between the actuator 5c and the link mechanism 4b. Further in the example illustrated in FIG. 10, a mechanism (for example, a belt or a pulley) to offset the output shaft of the actuator 5c is provided when the angle between the link mechanisms 4b and 4c is 70° and 60°. This is for the purpose of avoiding an interference between the actuators 5a and 5c, which are next to each other.

As illustrated in FIG. 11, when the angle between the link mechanisms 4b and 4c is 120°, 110°, and 100°, there is no interference between the spherical bearing 9c of the link mechanism 4c and the spherical bearing 9b of the link mechanism 4b (the spherical bearing 9b is next to the spherical bearing 9c) without changing the movable part diameter D. Thus, the movable part diameter D remains unchanged (D10≈D11≈D12). When the angle between the link mechanisms 4b and 4c is below 100°, however, it is preferable to increase the movable part diameter D in order to keep the spherical bearing 9c and the spherical bearing 9b sufficiently apart from each other to avoid an interference between the spherical bearing 9c and the spherical bearing 9b. In the second embodiment, as the angle between the link mechanisms 4b and 4c decreases to 90°, 80°, 70°, 60°, 50°, 40°, and 30°, the movable part diameter D gradually increases in the order of: D13, D14, D15, D16, D17, D18, and D19 (D13<D14<D15<D16<D17<D18<D19).

Thus, as the angle between the link mechanisms 4b and 4c is smaller, the link-mechanism extending dimensions of the link mechanisms 4b and 4c are smaller. When, however, the angle between the link mechanisms 4b and 4c is 80° or smaller, the base extending dimension of the base 2 is larger than the link-mechanism extending dimensions, that is, even if the angle between the link mechanisms 4b and 4c decreases to 80° or smaller, the width of the parallel link robot 1A cannot be reduced any further.

From the viewpoint of a balance of load between the link mechanisms 4a, 4b, and 4c, it is most preferable that the link mechanisms 4a, 4b, and 4c be arranged at equal 120-degree angular intervals and that the angle between the link mechanisms 4b and 4c be as large as possible. Also, as the angle between the link mechanisms 4b and 4c is smaller, the dimension (movable part diameter D) of the movable part 3 is larger, which is for avoidance of an interference between the spherical bearings 9c and 9b (which are next to each other). From the viewpoint of a reduction in the size of the movable part 3 as well, it is preferable that the angle between the link mechanisms 4b and 4c be as large as possible.

In light of these considerations, when the angle between the link mechanisms 4b and 4c is 80°, the base extending dimension of the base 2 is approximately identical to the link-mechanism extending dimensions of the link mechanisms 4b and 4c. This configuration reduces the width of the parallel link robot 1A while eliminating or minimizing an imbalance of load between the link mechanisms 4a, 4b, and 4c and eliminating or minimizing an increase in the dimension D of the movable part 3.

2-3. Configuration of Parallel Link Robot System

By referring to FIG. 12, description will be made with regard to an example configuration of a parallel link robot system 10A, which uses the parallel link robot 1A.

Figure 12:
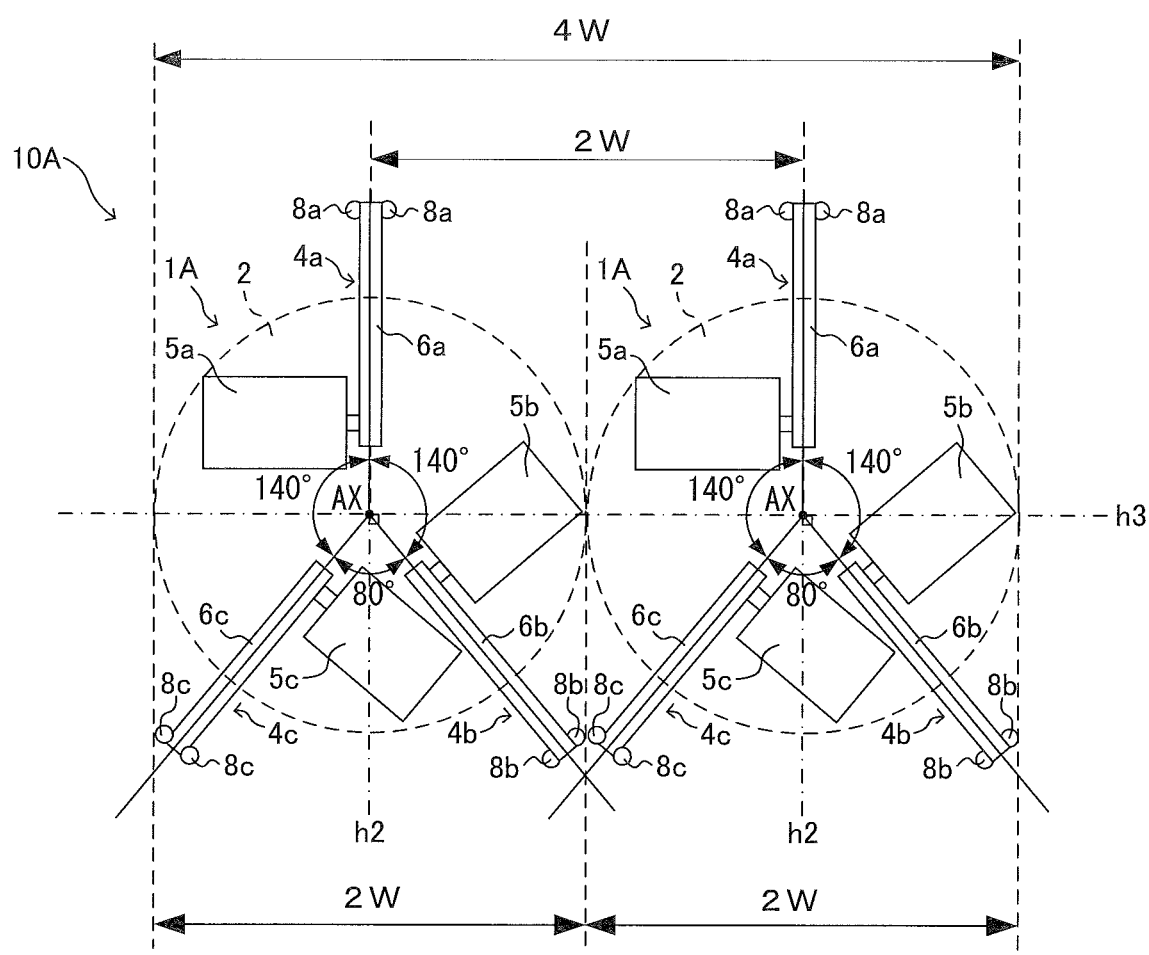
FIG. 12 illustrates an example configuration of a parallel link robot system that uses the parallel link robot according to the second embodiment.

As illustrated in FIG. 12, the parallel link robot system 10A according to the second embodiment includes two parallel link robots 1A. It is to be noted that the parallel link robot system 10A may include three or more parallel link robots 1A. The three link mechanisms 4a, 4b, and 4c of each parallel link robot 1 of the two parallel link robots 1A respectively include the driving links 6a, 6b, and 6c (which are non-limiting examples of the base-side ends recited in the appended claims) The driving links 6a, 6b, and 6c are arranged on the base 2 at angular intervals in the circumferential direction around the center axis AX. Specifically, the angle of the angular interval between the link mechanisms 4a and 4b is 140°; the angle of the angular interval between the link mechanisms 4b and 4c is 80°; and the angle of the angular interval between the link mechanisms 4c and 4a is 140°. The two parallel link robots 1A are oriented in such postures that the three link mechanisms 4a, 4b, and 4c of the two parallel link robots 1A are arranged in an approximately identical manner in the circumferential direction. Also, the two parallel link robots 1A are arranged next to each other in the normal line h3 directions, which are perpendicular to the bisecting lines h2, which bisect the 80-degree angular interval between the link mechanisms 4b and 4c of the two parallel link robots 1A. In other words, the two parallel link robots 1A are aligned with the center axes AX of the two parallel link robots 1A located on the normal line h3 such that the link mechanisms 4a of the two parallel link robots 1A are parallel to each other, that the link mechanisms 4b of the two parallel link robots 1A are parallel to each other, and that the link mechanisms 4c of the two parallel link robots 1A are parallel to each other.

As illustrated in FIG. 12, the width of the parallel link robot 1A in the normal line h3 directions is 2W, which is twice the robot half width W. That is, the two parallel link robots 1A are arranged with a pitch of 2W between the center axes AX of the two parallel link robots 1A, and the width of the parallel link robot system 10 as a whole is 4W.

Thus, the parallel link robot 1A according to the second embodiment has a smaller width than the width of the parallel link robot 1' according to the comparative example (FIG. 8), occupying a smaller amount of space. Since the parallel link robot system 10A according to the first embodiment has an advantageously smaller width than the width of the parallel link robot system 10' according to the comparative example (FIG. 8), the occupation space of the parallel link robot system 10A as a whole decreases advantageously. The downsizing effect of a parallel link robot system is more notably appreciated as the number of robots increases.

1-6. Advantageous Effects of Second Embodiment

As has been described hereinbefore, the parallel link robot 1A according to the second embodiment occupies a smaller amount of space, and the parallel link robot system 10A according to the second embodiment occupies a smaller amount of space, similarly to the first embodiment. Also, the other two angular intervals (among the three angular intervals, one of which is an acute angle) have identical angles. This prevents the parallel link robot 1A from being imbalanced, eliminating or minimizing vibration, noise, and other abnormal occurrences.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" mean "approximately identical", "approximately same", "approximately equivalent", and "approximately different", respectively, with design-related and production-related tolerance and error taken into consideration.

Otherwise, the first embodiment and modification may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A parallel link robot comprising:
   a base;
   a movable part which is movable along a center axis and to which an end effector is attachable;
   first, second and third link mechanisms provided around the center axis with angular intervals in a circumferential direction around the center axis to project outwardly along a radial direction with respect to the center axis, each of the first, second and third link mechanisms connecting the base and the movable part to move the movable part along the center axis, the angular intervals having an acute angular interval with an acute angle; and
   first, second and third actuators provided at the base to be connected to the first, second and third link mechanisms respectively so as to drive the first, second and third link mechanisms respectively.

2. The parallel link robot according to claim 1, wherein the angular intervals are different in angle from each other.

3. The parallel link robot according to claim 2, wherein the angular intervals comprise
   a 120-degree angular interval having an angle of 120°,
   a larger angular interval having a larger angle that is larger than 120° by a predetermined angle, and
   a smaller angular interval having a smaller angle that is smaller than 120° by the predetermined angle.

4. The parallel link robot according to claim 3,
   wherein the first link mechanism and the second link mechanism are arranged to have the 120-degree angular interval between the first link mechanism and the second link mechanism,
   wherein the third link mechanism has a link-mechanism extending dimension extending from the center axis along a bisecting line which bisects the 120-degree angular interval,
   wherein the base has a base extending dimension extending from the center axis in the bisecting direction, and
   wherein the predetermined angle is such an angle that the link-mechanism extending dimension is approximately equal to the base extending dimension.

5. The parallel link robot according to claim 4, wherein the angular intervals have 120°, 170°, and 70°.

6. The parallel link robot according to claim 1, wherein two angular intervals among the angular intervals and other than the acute angular interval have angles approximately identical to each other.

7. The parallel link robot according to claim 1, wherein each of the first, second and third actuators comprises
a motor part, and
an amplifier part integral to the motor part and configured to supply power to the motor part.

8. A parallel link robot system comprising:
first and second parallel link robots, each of the first and second parallel link robots comprising:
a base;
a movable part which is movable along a center axis and to which an end effector is attachable;
first, second and third link mechanisms provided around the center axis with angular intervals in a circumferential direction around the center axis to project outwardly along a radial direction with respect to the center axis, each of the first, second and third link mechanisms connecting the base and the movable part to move the movable part along the center axis, the angular intervals comprising:
a 120-degree angular interval having an angle of 120°;
a larger angular interval having a larger angle that is larger than 120° by a predetermined angle; and
a smaller angular interval having a smaller angle that is smaller than 120° by the predetermined angle; and
first, second and third actuators provided at the base to be connected to the first, second and third link mechanisms respectively so as to drive the first, second and third link mechanisms respectively, and
the first and second parallel link robots being arranged such that a first bisecting line which bisects the 120-degree angular interval of the first parallel link robot and a second bisecting line which bisects the 120-degree angular interval of the second parallel link robot are aligned and such that the first link mechanism of the first parallel link robot and the first link mechanism of the second parallel link robot are provided to be substantially parallel, the second link mechanism of the first parallel link robot and the second link mechanism of the second parallel link robot are provided to be substantially parallel, and the third link mechanism of the first parallel link robot and the third link mechanism of the second parallel link robot are provided to be substantially parallel.

9. A parallel link robot system comprising:
first and second parallel link robots, each of the first and second parallel link robots comprising:
a base;
a movable part which is movable along a center axis and to which an end effector is attachable;
first, second and third link mechanisms provided around the center axis with angular intervals in a circumferential direction around the center axis to project outwardly along a radial direction with respect to the center axis, each of the first, second and third link mechanisms connecting the base and the movable part to move the movable part along the center axis, the angular intervals having an acute angular interval with an acute angle; and
first, second and third actuators provided at the base to be connected to the first, second and third link mechanisms respectively so as to drive the first, second and third link mechanisms respectively, and
the first and second parallel link robots being arranged such that a first line perpendicular to a bisecting line which bisects the acute angle of the first parallel link robot and a second line perpendicular to a bisecting line which bisects the acute angle of the second parallel link robot are aligned and such that the first link mechanism of the first parallel link robot and the first link mechanism of the second parallel link robot are provided to be substantially parallel, the second link mechanism of the first parallel link robot and the second link mechanism of the second parallel link robot are provided to be substantially parallel, and the third link mechanism of the first parallel link robot and the third link mechanism of the second parallel link robot are provided to be substantially parallel.

10. The parallel link robot according to claim 2, wherein each of the first, second and third actuators comprises
a motor part, and
an amplifier part integral to the motor part and configured to supply power to the motor part.

11. The parallel link robot according to claim 3, wherein each of the first, second and third actuators comprises
a motor part, and
an amplifier part integral to the motor part and configured to supply power to the motor part.

12. The parallel link robot according to claim 4, wherein each of the first, second and third actuators comprises
a motor part, and
an amplifier part integral to the motor part and configured to supply power to the motor part.

13. The parallel link robot according to claim 5, wherein each of the first, second and third actuators comprises
a motor part, and
an amplifier part integral to the motor part and configured to supply power to the motor part.

14. The parallel link robot according to claim 6, wherein each of the first, second and third actuators comprises
a motor part, and
an amplifier part integral to the motor part and configured to supply power to the motor part.

* * * * *